UNITED STATES PATENT OFFICE.

LOUIS HARPER, OF BROOKLYN, NEW YORK.

IMPROVEMENT IN RESTORING PHOSPHATIC GUANO.

Specification forming part of Letters Patent No. 41,428, dated February 2, 1864.

*To all whom it may concern:*

Be it known that I, LOUIS HARPER, of the city of Brooklyn, county of Kings, State of New York, have invented a new and improved process of rendering the insoluble, Pacific, or phosphatic guano—a mere earthy phosphate of lime insoluble in water, nearly entirely destitute of ammoniacal and alkaline salts, and such as it comes to us nearly entirely rejected as a fertilizer by our agriculturists—a superior fertilizer, equal, if not superior, to Peruvian guano, its elements of fertility being in a more fixed and lasting state and in more adequate proportions; and I do hereby declare that the following is a full and exact description thereof.

To enable others to make use of my invention, I will first state the general principles thereof, and give, secondly, a particular description by adopting certain proportions of the ingredients, prefacing here, nevertheless, that those proportions have only been adopted for example's sake, and may be changed, according to the judgment of the operator and the lands and crops for which the improved guano is destined.

The tendency of my invention is to restore to the phosphatic guano those necessary elements of fertility washed and leached out of it by a long exposition to heavy tropical rains, and to render a part of the earthy phosphates again soluble in water. According to my new precess, which I term the "digestive process," in order to distinguish it at once from another and entirely different one, also of my invention—the decomposing process—this is to be accomplished in four distinct operations:

First. By the operation of nitrogenizing, renewing, or refreshing a portion of the phosphatic guano. This is a preliminary process, and must be performed before the other operations are commenced, in order to give the guano undergoing this process time to mature and dry. It is done by heaping up about two-thirds of the phosphatic guano destined to be restored by my process or forming it into a bed or layer with elevated borders, and moistening it repeatedly with animal broth or juice or urine until the whole mass has been thoroughly penetrated and moistened by the liquid. The animal juice or broth may be prepared by boiling offal of meats or dead animals of all description, as it is frequently done in the large cities with dead horses or other animals, in order to save the fat and bones, or by pressing fish for their oil, as it is the custom all along the coast of the Atlantic Ocean from New Jersey to Maine. For localities to perform the nitrogenizing process, any place sheltered from the atmospheric precipitations may be used; but the best are such buildings or sheds where the guano, after having been nitrogenized, can be exposed either to the rays of the sun or artificial heat or to the free draft of air, or to both together, for when the guano has been thoroughly moistened it has to be exposed either to a draft of air or to heat, in order to heat thoroughly and dry again, to make it again fit for the absorption of moisture. Before the thoroughly-moistened guano is exposed to air or heat it must be sprinkled over either with a weak solution of protosulphate of iron, (copperas or green vitriol,) or of chloride of magnesium, (bitterns of salt-works,) or of chloride of calcium or chlorate of lime, or even with a weak solution of sulphuric or hydrochloric acids or a small quantity of sulphate of lime, in order to prevent an escape of any quantity of nascent ammonia. This nitrogenizing, refreshing, or renewing process has for its object the refertilizing of the earthy phosphates and the increase of the quantity of ammonia without too much increasing the bulk and decreasing therewith the percentage of the most valuable phosphates.

Secondly. By the operation of preparing an adequate quantity of nitrogenous animal matter by a chemical digestion for reimpregnating the phosphatic guano with ammonia and carbonized animal matter. This operation is performed in the following manner: A certain quantity of nitrogenous animal matter of any description—as offal from slaughtered animals or dead animals or fish, provided it has not lost its nitrogen—enough to produce the desired quantity of ammonia for a designated quantity of the guano, is introduced in a metallic or wooden boiler. A sufficient quantity of alkaline salts is added, in order to set the nitrogen free and restore alkaline salts to the guano, also such quantities of sulphate of iron or chloride of magnesium or calcium or chlorate of lime (either or adequate portions of several or all) which will afford sufficient quantities of acid and chlorine or acid or chlorine alone to nearly fix all the ammonia originating from the nitrogenous matter. The mass is then boiled, either by fire immediately or by steam, until it is entirely penetrated by the salts added to it and entirely disintegrated, bones and all, and reduced to a homogeneous pulp. The alkalies selected for the above use must be in such a state as not to interfere with the ammonia. It is best to select alkaline sulphates. For fixing the ammonia, equal quantities of protosulphate of iron (green vitriol and copperas) and chloride of magnesium are preferable, although not absolutely necessary. Either may be used alone, and such other chlorides or chlorates, in case of necessity, substituted whose bases have less affinity to their acids than the nascent ammonia. Even small quantities of hydrochloric or sulphuric acids may be used, together with other salts. It is not absolutely necessary to add a sufficient quantity of salts to fix the whole quantity of ammonia originating from the nitrogenous matter by this process. The quantity must be judiciously determined, in order to prevent an escape of the most ready nitrogen and ammonia. The process next to be described, of restoring the solubility of a considerable portion of the earthy phosphates, by means of sulphuric acid, ($SO_3$) produces a certain quantity of sulphate of lime sufficient to convert a considerable portion of the ammonia into a sulphate, and this may be taken in consideration.

Third. By the operation of converting a portion of the earthy or bone phosphate of the phosphatic guano into a soluble bi or super phosphate. This process is well known, and it is only essential to determine the right quantity of sulphuric acid ($SO_3$) to be used for the phosphatic guano. Careful experiments and calculation have convinced me that one hundred pounds of phosphatic guano require 35.9 pounds of anhydrous sulphuric acid ($SO_3$.) Both afford sixty-one pounds of sulphate of lime, fifty-three pounds of biphosphate of lime, and leave thirty pounds of organic and alkaline matter uncombined. The whole yield of the mixture is therefore, when dry, one hundred and forty-four pounds—8.1 pounds more than the weight of sulphuric acid and guano together. This is the amount of water (two atoms) which combine with the biphosphate of lime after separation of two atoms of lime from it by the sulphuric acid. It is safest to perform the process of treating the phosphatic guano with sulphuric acid in the following manner: Select a large wooden base adequate to the quantity to be used. Introduce into the same, first, about four times the quantity of water, by weight, of the sulphuric acid. Then stir into the water the phosphatic guano, avoiding any coagulation of the guano. When the guano appears as a homogeneous pulp pour in carefully the sulphuric acid under continual stirring with wooden instruments, and continue the stirring until the mass is perfectly mixed and uniform in appearance. The mass must then stand from twenty-four to seventy-two hours, according to the temperature of the atmosphere, a shorter time in hot, a longer time in cold weather. It is then ready for use. The sulphuric acid here alluded to is anhydrous ($SO_3$) of the chemist. If common sulphuric acid or oil of vitriol is taken, which contains about one-fourth of water, that much more must be taken—one hundred and twenty-five for one hundred pounds. It is not absolutely necessary that this process should be performed in a wooden box. It may be performed in any other convenient manner; but by performing it in a wooden box a more intimate mixture of acid and guano is accomplished, and the yield of sulphate of lime and biphosphate of lime is greater.

Fourth. When the above three operations are preformed and the preparations are ready the fourth is commenced, which only consists in a most careful and intimate mixture of all the three preparations in the devised proportions. This done, the mixed mass is heaped up in a store house or shed. It is necessary to pay a great deal of attention to the state of moisture in which the mass is after mixture. It ought not to be too dry, nor too wet. It must just contain moisture enough to ferment and heat and remain in this state for some time. If it should not contain moisture enough, it can be sprinkled over during its mixing with animal juice or urine, or simply with water, if none of the former should be on hand. In order to prevent the mass from being too wet, it is necessary to have the nitrogenized guano well dried, to enable it to absorb the moisture of the other two preparations. The locality, shed, or store-room for storing and preserving the guano, after having undergone the fourth process of mixing, is the more appropriate the more heat can be applied to the mass. It is not necessary to apply any other heat but that of the atmosphere even in the shade of a house if the mass can remain a long time. For instance, if the supply for the year can be made a year previous and remain in the store-house or shed from the summer to the next spring; but if it is desired that the improved guano should be used after a few weeks, artificial heat must be employed either by means of a glass house, or by fire or steam. It is enough if the mixed mass can be exposed to the rays of the sun for three weeks or a month. If artificial heat is applied, it must not exceed nor even amount to boiling-heat, else a portion of the ammonia might be liberated. When the mass has been mixed and heaped up in the shed or storehouse its surface must be sprinkled over exactly as it has been described above at the first operation, in order to prevent an escape of ammonia from the surface.

I have above stated the general principles of my invention. I will now, for a better understanding, describe particulars, but only for example's sake, without putting a particular value upon quantities adopted. In order to improve a ton of two thousand pounds of the guano, or, rather, produce a ton of improved guano—

First. Nitrogenize four hundred and sixty-six pounds of the phosphatic guano, as it has above been described under operation No. 1, and try to have it as dry as possible before commencing the other operations.

Second. Introduce then in a boiler six hundred pounds of dry nitrogenous animal matter. If it is not dry, ascertain the quantity of moisture and subtract it from the weight. Add then one hundred and sixty pounds of alkaline salts, if possible, sulphates—for instance, sulphate of soda—two hundred pounds of protosulphate of iron, and one hundred and twenty pounds of chloride of magnesium, (bitterns and pouscales of salt-works,) and bail the mixture as above described under operation No. 2.

Third. Introduce at the same time, or even previously, in a large wooden box, about six hundred pounds of water. Stir in the same three hundred and thirty-four pounds of phosphatic guano. Stir until all the lumps have disappeared, and then pour carefully in one hundred and twenty pounds of anhydrated or one hundred and fifty pounds of common sulphuric acid or oil of vitriol, and continue stirring until the mass is completely mixed. Let the preparation stand until all the guano is completely dissolved, for from twenty-four to seventy-two hours.

Fourth. When all the preparations are ready mix all three carefully together, heap the mixture up, and sprinkle it over, as above described. Let it then rest until it has been fermenting and heated at least for a month. It is then ready for use.

The thus prepared and improved guano contains then—

| Per ton of 2,000 lbs.: | Lbs. | Per 100 lbs.: | Lbs. |
|---|---|---|---|
| Nitrogenous matter | 600 | Nitrogenous matter | 30.0 |
| Protosulphate of iron | 200 | Sulphate of iron | 10.0 |
| Chloride of magnesium | 120 | Chloride of magnesium | 6.0 |
| Alkaline salts | 160 | Alkaline salts | 8.0 |
| Sulphuric acid | 120 | Sulphuric acid | 6.0 |
| Guano for the acid | 334 | Guano for the acid | 16.7 |
| Nitrogenized guano | 466 | Nitrogenized guano | 23.3 |
|  | 2,000 |  | 100.0 |

If the above-described operations are carefully and faithfully performed after completion of the different chemical processes during heating and fermentation of the mass, the chemical analysis will be found as follows:

| | |
|---|---|
| Biphosphate of lime | 8.85 |
| Bone-phosphate | 16.31 |
| Chloride of ammonium | 6.57 |
| Sulphate of ammonia | 13.24 |
| Sulphate of lime | 1.72 |
| Carbonate of lime | 5.63 |
| Carbonate of magnesia | 4.47 |
| Alkaline sulphates | 8.00 |
| Protoxide of iron | 2.71 |
| Carbonized animal matter | 25.50 |
| Organic animal matter remaining from the guano | 12.00 |
| Loss of water from the sulphate of iron | 4.19 |
| | 109.19 |
| Gain of water, hydrogen, oxygen, and carbonic acid | 9.19 |
| | 100. |

This analysis shows conclusively the superiority of this my new process and its entire difference from the decomposing process.

What I claim, and desire to secure by Letters Patent of the United States, is—

The process above described of improving Pacific or phosphatic guano in its quality as a fertilizer.

LOUIS HARPER.

Witnesses:
FREDERICK BECHTEL,
ED. C. MOREHOUSE.